United States Patent [19]
Wessels et al.

[11] Patent Number: 4,607,661
[45] Date of Patent: Aug. 26, 1986

[54] CHECK VALUE

[75] Inventors: Lür Wessels, Stuhr; Johannes Tetzner, Bremen, both of Fed. Rep. of Germany

[73] Assignee: GESTRA Aktiengesellschaft, Bremen, Fed. Rep. of Germany

[21] Appl. No.: 725,373

[22] Filed: Apr. 22, 1985

[30] Foreign Application Priority Data

May 12, 1984 [DE] Fed. Rep. of Germany ....... 3417770
Feb. 13, 1985 [DE] Fed. Rep. of Germany ....... 3504827

[51] Int. Cl.$^4$ .................... F16K 15/03; F16K 47/00
[52] U.S. Cl. .................... 137/512.1; 137/514; 137/527
[58] Field of Search ........... 137/512, 512.1, 514, 137/514.3, 514.5, 514.7, 527, 527.8; 251/48, 298

[56] References Cited

U.S. PATENT DOCUMENTS

| | | | |
|---|---|---|---|
| 627,049 | 6/1899 | Cash | 137/514 |
| 982,400 | 1/1911 | Walker | 137/514.5 |
| 2,027,455 | 1/1936 | Seibt | 137/514 |
| 2,578,590 | 12/1951 | Perrault | 137/514 |
| 3,098,502 | 7/1963 | Deve | 137/514 |
| 3,106,220 | 10/1963 | Hose | 137/514 |
| 3,177,894 | 4/1965 | Camp | 137/527 |
| 3,425,436 | 2/1969 | Napolitano | 137/512 |
| 4,196,745 | 4/1980 | Schützer | 137/512.1 |
| 4,330,006 | 5/1982 | Eck et al. | 137/514 |
| 4,443,894 | 4/1984 | Klawitter | 137/527 |
| 4,445,533 | 5/1984 | DeFrees | 137/512.1 |

FOREIGN PATENT DOCUMENTS

| | | | |
|---|---|---|---|
| 2335584 | 1/1975 | Fed. Rep. of Germany | 137/514 |
| 0036689 | 9/1978 | Japan | 137/514 |

Primary Examiner—G. L. Walton
Attorney, Agent, or Firm—Collard, Roe & Galgano

[57] ABSTRACT

A check valve is provided having a valve casing, at least one pivotable closure element and at least one movable control element connected with an operating rod which cooperates with said closure element. The operating rod extends transversely to the longitudinal axis of the valve casing and motion-translating coupling means are arranged between the operating rod and the closure element.

9 Claims, 3 Drawing Figures

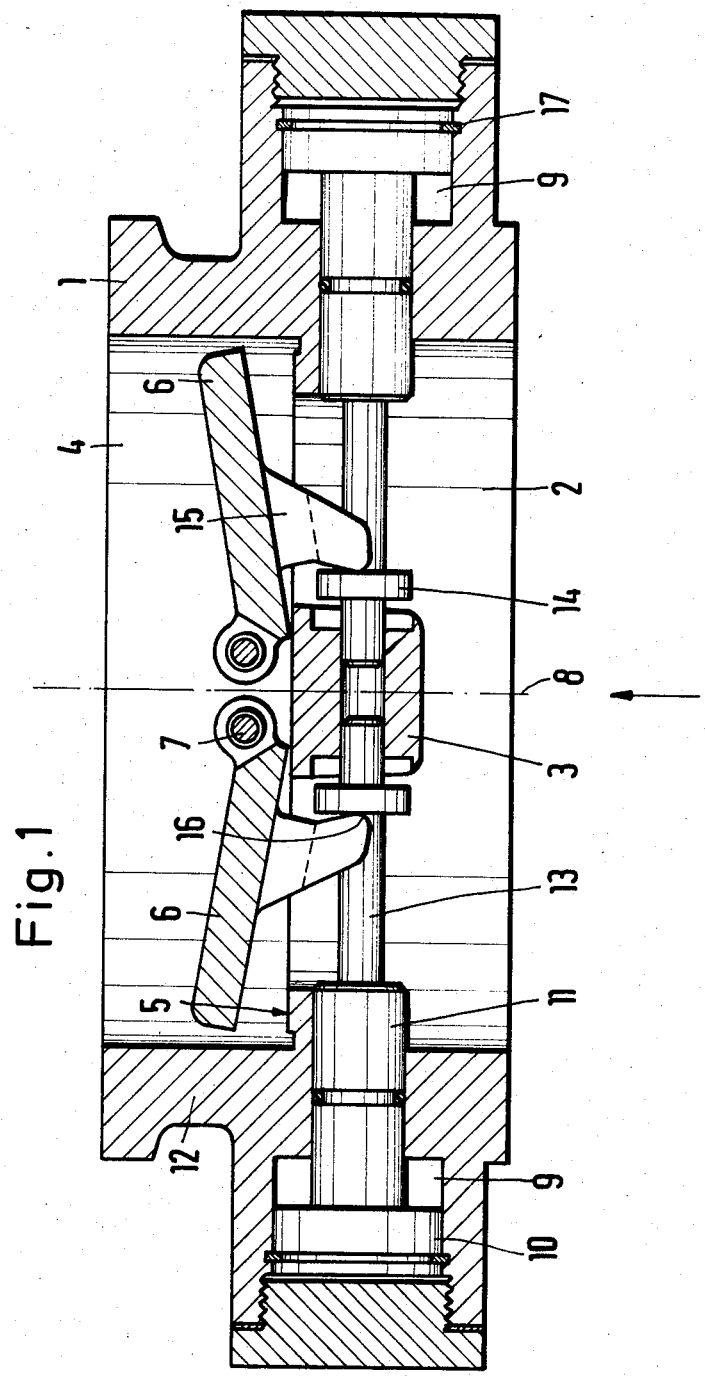

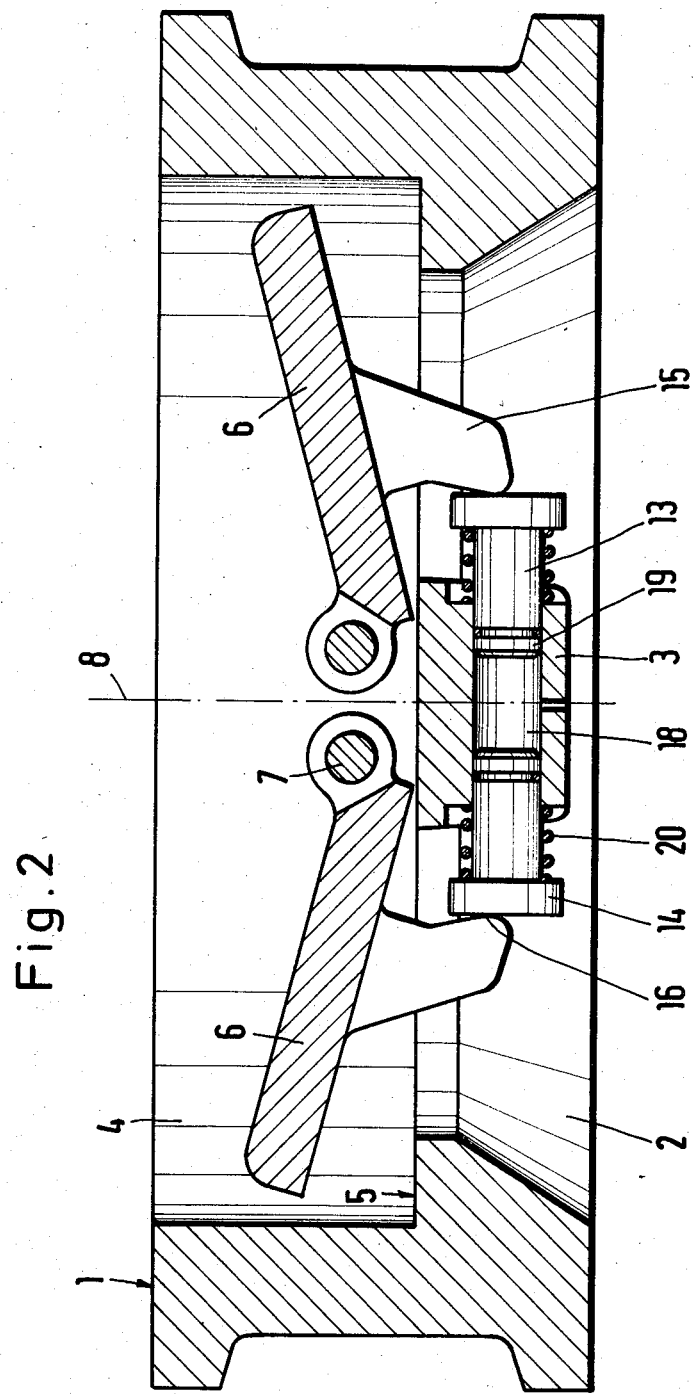

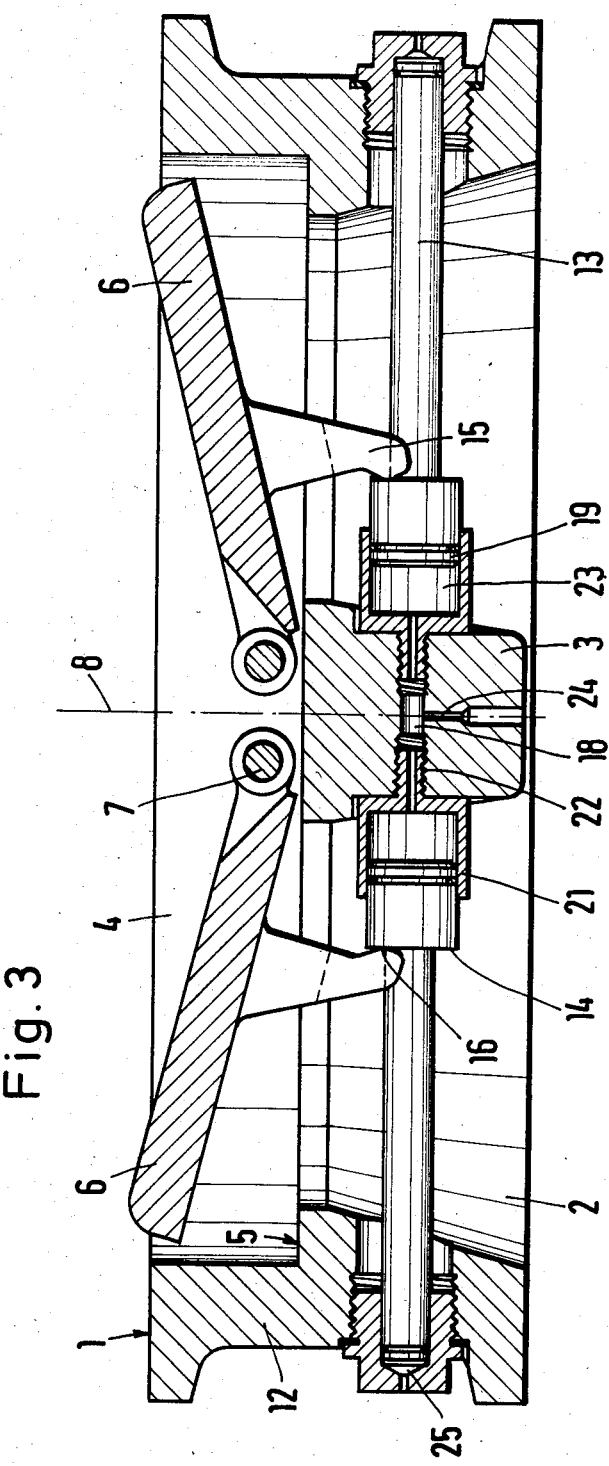

CHECK VALUE

The present invention relates generally to a check valve and, more particularly, it relates to a check valve including a damping mechanism for damping the closing movement of the closure element.

A check valve of the type with which the present invention is concerned is disclosed in U.S. Pat. No. 3,098,502, to Devi, granted July 23, 1963. The valve described in this patent includes a control member in an external cylinder with a damping piston and a lifting bar which extends with an acute angle with respect to the casing of the valve. From the area around the inlet duct, the lifting bar angularly extends into the interior of the valve casing, and, in its initial operating position, projects through the opening of the seat of the valve and up into the outlet duct of the casing of the valve. During the last phase of its closing stroke, the valve comes to rest with its face side on the end of the lifting rod remote from the damping piston. Subsequently, the damping piston connected to said rod or bar decelerates the closing motion of the valve. A return spring disposed in the cylinder returns the piston and the lifting rod to the initial operating position when the valve opens.

With this known design, the control member and the lifting bar necessitate a large valve length. Thus, such a solution is unsuitable where check valves of short total length are required, and those with fittings that clip into a system.

It is, therefore, the object of the present invention to provide a check valve of the above described type in which the control member and the lifting bar require particularly small design dimensions.

This object, as well as others which will hereinafter become apparent, is accomplished in accordance with the present invention by providing a check valve with a valve casing having an inlet duct and an outlet duct, at least one sealing valve in the outlet duct pivotably supported therein, a control means capable of a lifting movement, and an operating rod or bar projecting into the interior space of the valve casing. The operating rod is connected with the control means on the one hand and cooperates with the closure element or sealing valve on the other hand at least over part of the pivoting movement thereof. The operating rod extends into the inlet duct of the valve casing substantially transversely to the longitudinal axis of the casing. A coupling means for translating motion is arranged between the operating rod and the sealing valve, one element of said means being adapted for an arcuate motion and another element being adapted for a lifting motion.

Since the control means, which preferably is a piston-cylinder assembly, is positioned transversely to the longitudinal axis of the valve casing, its diameter rather than its length is relevant to the design length of the valve. The solution proposed by the present invention, therefore, is also suitable for check valves having a short casing, for example those designed to be installed in a system by clipping or clamping. The operating rod is capable of a stroke movement and the closure valve capable of pivotable movement, said operating rod is movable substantially transversely to the longitudinal axis of the casing and transversely to the plane of the valve seat, respectively, and said parts are adapted to cooperate with each other by the coupling means.

In a preferred embodiment, the bridge or crosspiece of the valve is directly associated with the control means in that it acts as the cylinder thereof. In this way, a minimum number of components and a minimum amount of working steps are required in the manufacture of the valve. Alternatively, the design may comprise as cylinders for the pistons separate bushings provided externally on the bridge or crosspiece of the valve casing. This permits the selection of materials for the cylinders irrespective of the type of material used for the casing. Only relatively small holes for fastening the cylinder bushings need be provided on the crosspiece or bridge of the valve casing. Therefore, the rigidity of the bridge is not noticeably reduced, which is advantageous particularly with high pressure ratings.

In a further preferred embodiment, the pistons of the control means are returned to their initial operating positions by the initial pressure applied during opening of the closing valves without requiring return springs.

Other objects and features of the present invention will become apparent from the following detailed description considered in connection with the accompanying drawings. It is to be understood, however, that the drawings are designed as an illustration only and not as a definition of the limits of the invention.

In the drawings wherein similar reference characters denote similar elements throughout the several views:

FIG. 1 is a cross-sectional view of a check valve according to the present invention with two externally disposed control members acting as a damping device for the closing movement of the valve;

FIG. 2 is a cross-sectional view of another embodiment of a check valve according to the present invention with two interior control members acting as a damping device for the closing movement of the valve; and FIG. 3 is a cross-sectional view of yet another embodiment of a check valve according to the present invention with two control members acting as a damping device for the closing movement.

Each of the check valves shown in the figures has a short valve casing 1, which may be clipped and clamped, for example between two flanges (not shown) of a conduit for conducting a flowing medium. Valve casing 1 includes an inlet duct 2 with a crosspiece or bridge 3 extending crosswise in said duct, an outlet duct 4 and a valve seat 5. Two semicircular closure parts or valves 6 disposed in outlet duct 4 cooperate with valve seat 5. Said closing parts or valves are pivotably supported on their adjacent edges on two pins 7 disposed downstream of crosspiece 3 of the valve casing.

In FIG. 1, valve casing 1, furthermore, has two control means which include pressure chambers 9 diametrically opposing each other exteriorly of inlet duct 2 and extending substantially transversely to the longitudinal axis 8 of valve casing 1. A part 10 of a stepped piston is disposed in each pressure chamber 9 and is provided with a larger diameter than the part 11 of said piston, which, with its smaller diameter, extends through wall 12 of the valve casing and projects into inlet duct 2. An operating rod 13 is connected with each part 11 of the stepped pistons and extends transversely to longitudinal axis 8 of the valve casing parallel to valve seat 5 from wall 12 up to crosspiece 3 of the casing, where the rod is controlled or guided on its end averted from its associated piston. Adjacent crosspiece 3 of the casing, each operating rod 13 supports a driver 14 in the form of a stop collar. On their inlet sides, both closure valves 6 are provided with cams 15 having operating ends 16 engaging the face sides of drivers 14 on the side facing the parts 11 of the stepped pistons.

With normal flow of the medium in the direction of the arrow (forward flow), the two closure parts or valves 6 are in the open position. The inlet pressure acting on the two parts 11 of the stepped pistons holds the stepped pistons 10, 11 in the initial operating position shown in the drawing, said position being determined by stop rings 17.

When this forward flow stops, the two closure parts 6 move in the closing direction. When valves 6 have reached the partly open position shown in the drawing, the operating ends 16 of cams 15 of valves 6 come to rest on drivers 14. Resistance is offered to parts 10 of the stepped piston by a damping medium present in pressure chambers 9. In order to further close the valve, the closing force acting upon closure parts 6 must overcome this resistance. The remaining or final closing movement is dampened in this manner.

As soon as the check valve opens again due to another forward flow, stepped pistons 10, 11 and the two operating rods 13 and their drivers 14 are returned to the initial operating position by means of the preliminary pressure.

Since each closure part or valve is associated with its own damping device 9-11, 13-17, each independently moving closure part 6 is dampened individually, so that optimal damping results can be achieved with this check valve. The two damping devices 9-11, 13-17 have identical structures and, furthermore, such devices are simple and favorable in terms of manufacturing expenditure.

In the embodiment according to FIG. 2, crosspiece 3 of the valve casing is provided with a cross bore 18 extending transversely to the longitudinal axis 8 of the valve casing. Two pistons 19 are disposed in bore 18 and extend in the form of operating rods 13 projecting laterally from crosspiece 3 of the casing. The ends of rods 13 disposed averted from their respective pistons act as drivers 14. On the one side, drivers 14 are acted upon by a return spring 20, and on the other side by the operating end 16 of a cam 15 provided on closure part 6.

The two pistons 19 and the cross bore 18 receiving said pistons jointly form two control means disposed at inlet duct 2 for damping the closing movement of closure parts 6. In the present embodiment, the check valve closes and the closing movement is dampened as described in connection with the description of the embodiment of FIG. 1.

When the check valve is open with flow in the forward direction, return springs 20 force pistons 20 into their initial operating positions (shown in the drawing) and hold the pistons in this position.

In the embodiment according to FIG. 3, pistons 19 are not disposed in cross bore 18 of crosspiece 3 of the casing, but rather are arranged in cylindrical bushings 21. Bushings 21 are disposed in inlet duct 2 laterally on crosspiece 3 of the casing and, on their ends disposed averted from their associated pistons, fastening pins 22 are provided, supported in cross bore 18. The interior spaces 23 of cylindrical bushings 21 are communicatively connected with inlet duct 2 of valve casing 1 by means of a cross bore 18 and a choke opening 24. Operating rods 13 extend through inlet duct 2 transversely to longitudinal axis 8 of the valve casing towards wall 12 of the casing, where each rod 13 is supported in a space 25. Space 25 is communicatively connected with this atmosphere surrounding valve casing 1.

When the check valve is open with forward flow of medium, pistons 19 are held in the initial operating position (shown in the drawing) by the pressure difference between the spaces 23 and 25.

Also with the present embodiment, closing of the valve and damping of the closing movement take place as described in connection with the description of the embodiment of FIG. 1.

When the check valve opens again due to a forward flow of medium, pistons 19 with operating rods 13 and drivers 14 are returned to the initial operating position (shown in the drawing) due to the difference in pressure between the spaces 23 and 25. No return springs are required.

With the embodiments shown in FIGS. 2 and 3, the outside diameter of the valve casing is of the same order of magnitude as that of nonreturn valves without a damping device for the closing movement. Furthermore, for damping the closing movement, the present design does not comprise any components projecting radially outwardly beyond said diameter. The check valves according to the invention are particularly small both with respect to their length and dimensions of the casing in the radial direction as compared to the nominal width.

Instead of using a piston, the control means may be provided with a membrane or bellows, or, by way of example, a friction element may be used.

While a few embodiments of the present invention have been shown and described, it will be obvious that many changes and modifications may be made thereunto without departing from the spirit and scope of the invention.

What is claimed is:

1. In a check valve having a valve casing with an inlet duct and an outlet duct, at least one sealing valve in the outlet duct pivotably supported therein, a control means capable of a lifting movement, and an operating rod operatively connected with said control means, said operating rod projecting into the interior of said valve casing and cooperating with the sealing valve at least over part of the path of the pivoting movement thereof, the improvement comprising said operating rod extending into the inlet duct of said valve casing substantially transversely to the longitudinal axis of said valve casing, a driver provided on said operating rod, and a cam provided on the inlet side of said sealing valve, said cam having an operating end engaging said driver over at least a portion of the pivotal movement of said sealing valve to allow the control means to act on said at least one sealing valve between open and closed positions.

2. The check valve as defined in claim 1, wherein said operating rod extends through the inlet duct from a zone remote from the pivotal mounting of said sealing valve up to a zone near the pivotal mounting of said sealing valve;

said control means being disposed at the end of said operating rod remote from said pivotal mounting;
said driver being arranged within the zone of the operating rod near to the pivotal mounting; and
said cam engaging the face side of the driver facing said control means.

3. The check valve as defined in claim 1, wherein two sealing valves are provided, said valves being pivotably supported on their adjacent edges, and two diametrically opposed control means with associated operating rods and motion-translating coupling means.

4. In a check valve having a valve casing with an inlet duct and an outlet duct, at least one sealing valve in the outlet duct pivotably supported therein, a control means capable of a lifting movement consisting of a pressure chamber and a stepped piston having a first part with a first diameter disposed within said pressure chamber and a second part with a second diameter smaller than said first diameter extending into said inlet duct, and an operating rod operatively connected with said control means, said operating rod projecting into the interior of said valve casing and cooperating with the sealing valve at least over part of the path of the pivoting movement thereof, said second part being responsive to inlet pressure within the inlet duct so as to act on said sealing valve the improvement comprising said operating rod extending into the inlet duct of said valve casing substantially transversely to the longitudinal axis of said valve casing, and coupling means for translating motion arranged between said operating rod and said sealing valve, one element thereof being adapted for an arcuate motion and another element thereof being adapted for a lifting motion.

5. In a check valve having a valve casing with an inlet duct and an outlet duct, two sealing valves in the outlet duct pivotably supported therein at their adjacent edges, a casing bridge disposed upstream of said adjacent valve edges on the inlet side, at least two control means arranged on the bridge of said valve casing each being capable of a lifting movement and being responsive to inlet pressure within said inlet duct for acting on said valves, and two operating rods each operatively connected with one of said control means, said operating rods projecting into the interior of said valve casing and cooperating with the sealing valves at least over part of the path of the pivoting movement thereof, the improvement comprising said operating rods extending into the inlet duct of said valve casing substantially transversely to the longitudinal axis of said valve casing, and coupling means for translating motion arranged between each operating rod and associated sealing valve, one element thereof being adapted for an arcuate motion and another element thereof being adapted for a lifting motion.

6. The check valve as defined in claim 5, wherein each of said two control means includes a transverse bore extending in the birdge of said casing in the direction of the associated operating rod, and a piston supported in said bore.

7. The check valve as defined in claim 5, wherein each of said two control means includes a piston and a cylinder bushing having one end supported on said bridge of said casing and the other end receiving the piston.

8. The check valve as defined in claim 7, wherein the interior spaces of said cylinder bushings are communicatively connected with the inlet duct, and each of the operating rods, with its end remote from said bridge, is supported in a space having a lower pressure than the inlet duct.

9. The check valve as defined in claim 8, wherein said space within which each of said ends of said operating rods is supported communicates with the atmosphere.

* * * * *